(12) United States Patent
Diamos et al.

(10) Patent No.: US 10,679,643 B2
(45) Date of Patent: Jun. 9, 2020

(54) AUTOMATIC AUDIO CAPTIONING

(71) Applicants: Gregory Frederick Diamos, San Jose, CA (US); Sudnya Diamos, San Jose, CA (US); Michael Allen Evans, San Jose, CA (US)

(72) Inventors: Gregory Frederick Diamos, San Jose, CA (US); Sudnya Diamos, San Jose, CA (US); Michael Allen Evans, San Jose, CA (US)

( * ) Notice: Subject to any disclaimer, the term of this patent is extended or adjusted under 35 U.S.C. 154(b) by 212 days.

(21) Appl. No.: 15/691,546

(22) Filed: Aug. 30, 2017

(65) Prior Publication Data

US 2018/0061439 A1 Mar. 1, 2018

Related U.S. Application Data

(60) Provisional application No. 62/382,197, filed on Aug. 31, 2016.

(51) Int. Cl.

| G10L 15/00 | (2013.01) |
| G10L 21/10 | (2013.01) |
| G10L 15/24 | (2013.01) |
| G10L 15/16 | (2006.01) |
| G10L 15/02 | (2006.01) |
| G10L 15/06 | (2013.01) |
| G10L 19/00 | (2013.01) |
| G10L 15/183 | (2013.01) |
| G10L 25/30 | (2013.01) |

(52) U.S. Cl.
CPC ............. *G10L 21/10* (2013.01); *G10L 15/02* (2013.01); *G10L 15/063* (2013.01); *G10L 15/16* (2013.01); *G10L 15/183* (2013.01); *G10L 15/24* (2013.01); *G10L 19/00* (2013.01); *G10L 25/30* (2013.01)

(58) Field of Classification Search
CPC combination set(s) only.
See application file for complete search history.

(56) References Cited

U.S. PATENT DOCUMENTS

| 9,378,733 B1 * | 6/2016 | Vanhoucke | ............ G10L 15/02 |
| 2017/0004824 A1 * | 1/2017 | Yoo | ...................... G06F 17/2818 |
| 2017/0278525 A1 * | 9/2017 | Wang | ...................... G10L 25/84 |

OTHER PUBLICATIONS

Johnson et al., "DenseCap: Fully convolutional localization networks for dense captioning," Proceedings of the IEEE Conference on Computer Vision and Pattern Recognition, 2016, pp. 4565-4574.
Amodei et al., "Deep speech 2: End-to-end speech recognition in english and mandarin," International Conference on Machine Learning, 2016, pp. 1-10.

(Continued)

*Primary Examiner* — Vu B Hang

(57) ABSTRACT

A method, computer readable medium, and system are disclosed for audio captioning. A raw audio waveform including a non-speech sound is received and relevant features are extracted from the raw audio waveform using a recurrent neural network (RNN) acoustic model. A discrete sequence of characters represented in a natural language is generated based on the relevant features, where the discrete sequence of characters comprises a caption that describes the non-speech sound.

20 Claims, 8 Drawing Sheets

(56) References Cited

OTHER PUBLICATIONS

Glorot et al., "Understanding the difficulty of training deep feedforward neural networks," Proceedings of the 13th International Conference on Artificial Intelligence and Statistics, vol. 9 of JMLR: W&CP 9, 2010, pp. 249-256.

Graves, A., "Supervised Sequence Labelling with Recurrent Neural Networks," Thesis, Technische Universitat Munchen, 2012, pp. 1-124.

Graves, A., "Adaptive Computation Time for Recurrent Neural Networks," Cornell University Library, 2017, pp. 1-19.

Bahdanau, Dzmitry, et al., "Neural Machine Translation by Jointly Learning to Align and Translate," ICLR Conference 2015, arXiv:1409.0473v7, May 19, 2016, pp. 1-15.

\* cited by examiner

AUTOMATIC AUDIO CAPTIONING

CLAIM OF PRIORITY

This application claims the benefit of U.S. Provisional Application No. 62/382,197 titled "AUTOMATIC AUDIO CAPTIONING," filed Aug. 31, 2016, the entire contents of which is incorporated herein by reference.

FIELD OF THE INVENTION

The present invention relates to audio captioning, and more particularly to automatic audio captioning of a digital audio stream using a deep recurrent neural network.

BACKGROUND

Abundant audio data exists given the proliferation of digital sensor technology, ever increasing computer storage capacity, and the ability to store, share, and distribute audio recordings on the internet. This is likely to increase substantially in the future. Unlike text and to some extent visual data, the ability of computer systems to understand the contents of audio data on a pragmatic level is limited to identification of specific musical recordings and to human speech recognition. There is a need for addressing these issues and/or other issues associated with the prior art. Having a readily available and accurate human readable description of all new audio would enable existing technologies for text processing such as internet search, sentiment analysis, compression, prediction, etc. to be applied directly to audio data.

SUMMARY

A method, computer readable medium, and system are disclosed for audio captioning. A raw audio waveform including a non-speech sound is received and relevant features are extracted from the raw audio waveform using a recurrent neural network (RNN) acoustic model. A discrete sequence of characters represented in a natural language is generated based on the relevant features, where the discrete sequence of characters comprises a caption that describes the non-speech sound.

DETAILED DESCRIPTION

Deep neural networks may be used to generate captions for a raw audio signal. Importantly, the captions describe non-speech events that are present in the raw audio signal. The caption is a discrete sequence of characters in a natural language, such as English. For example, a caption generated for a raw audio signal including a dog barking may be "a dog barks four times." The captions may also describe speech events by translating speech into text. For example, a caption generated for a raw audio signal including speech and a dog barking may be "a man says good morning" while "a dog barks four times." An audio captioning system receives a raw audio signal, processes the raw audio signal using 2D convolutional layers and a recurrent neural network (RNN) that form an RNN acoustic model. The RNN acoustic model is followed by a decoder and an RNN language model to generate a caption for the raw audio signal.

Figure 1A:
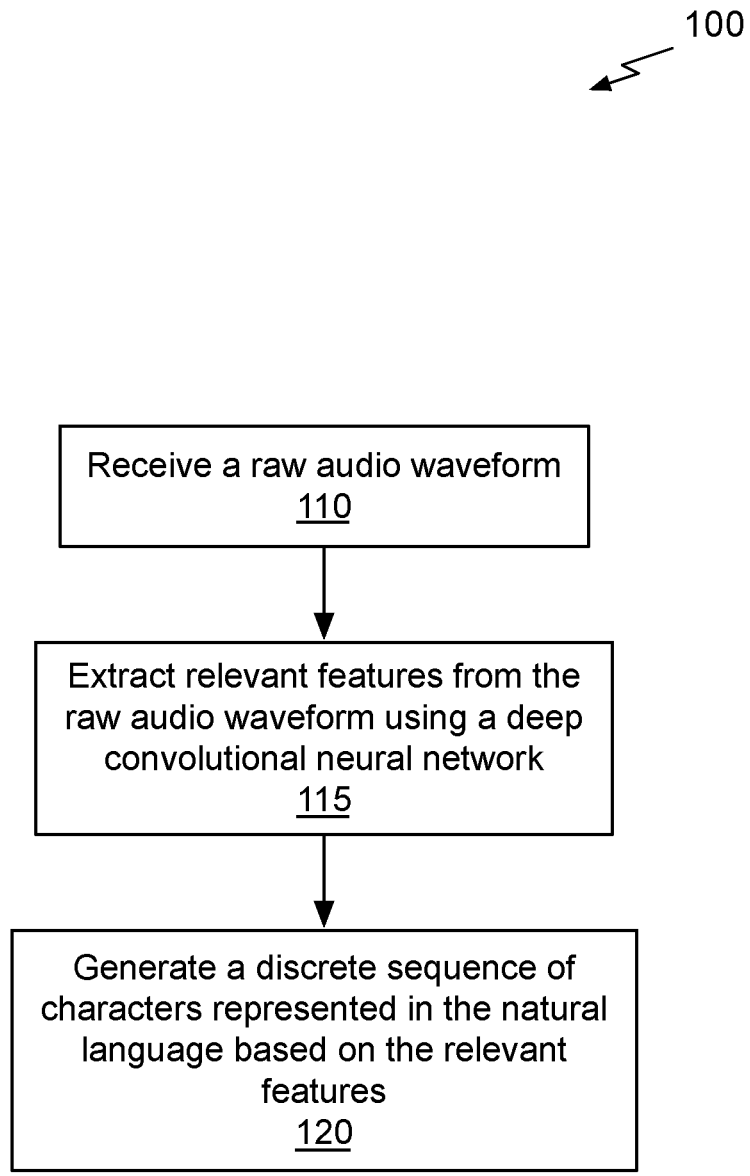
FIG. 1A illustrates a flowchart of a method for audio captioning, in accordance with one embodiment.

FIG. 1A illustrates a flowchart of a method 100 for automatic audio captioning, in accordance with one embodiment. Although method 100 is described in the context of the RNN acoustic model, decoder, and an RNN language model, the method 100 may also be performed by a program, custom circuitry, or by a combination of custom circuitry and a program. For example, the method 100 may be executed by a GPU, CPU, or any processor capable of performing the necessary operations. Furthermore, persons of ordinary skill in the art will understand that any system that performs method 100 is within the scope and spirit of embodiments of the present invention.

At step 110, a raw audio waveform including a non-speech sound is received by the audio captioning system. In one embodiment, the raw audio waveform is sampled to generate a sequence of discrete audio samples. In one embodiment the raw audio waveform is sampled at a high enough rate to at least cover (but optionally to exceed) the human auditory range (e.g., up to 20 KHz). In one embodiment, the audio samples are segmented into fixed width sub-sequences referred to as "frames" or "audio frames" that are provided as input to the RNN acoustic model. In one embodiment, the frame width is a hyper-parameter of the audio captioning system that may be tuned using cross-validation. An audio frame may correspond to one or more processing timesteps. Input preprocessing techniques such as standardization or domain transformations such as a linear or mel-scale spectrogram, volume normalization, resampling, etc. may be applied to the sequence of discrete audio samples before the frames are provided to the RNN acoustic model. In one embodiment, the use of frequency domain transformations reduces the size of the network required to achieve good performance. However, given enough training data and a large enough network, the performance (i.e., accuracy) of the system with and without the transformations may be similar.

At step 115, relevant features are extracted from the raw audio waveform using a recurrent neural network (RNN) acoustic model. At step 120, a discrete sequence of characters represented in a natural language is generated based on the relevant features, where the discrete sequence of characters comprises a caption that describes the non-speech sound.

In a first embodiment of the audio captioning system, the RNN acoustic model generates a set of characters for a sequence of timesteps and a corresponding probability distribution for each character in the set. A decoder in the first embodiment is a connectionist temporal classification (CTC) decoder that receives the sets of characters and probability distributions and constructs valid combinations of characters. The combinations of characters are each associated with a probability and a number of the combinations having the highest probabilities are output by the decoder to the RNN language model. The RNN language model then generates the caption. One or more pooling layers may be interleaved between the convolution and/or recurrent layers in the RNN acoustic model. The RNN acoustic model locates one or more non-speech and/or speech events in the audio signal and the RNN language model generates the caption.

In a second embodiment of the audio captioning system, the RNN acoustic model includes a context unit and generates a context vector for each timestep. A decoder is a feed forward neural network that implements an attention decoder. The attention decoder receives each character that is output by the RNN language model and a stream of context vectors from the RNN acoustic model. The attention decoder internally reduces each context vector to a single activation that indicates whether a sound event is present, the sound event (i.e., concept), and an attention weighting for the timestep. The attention decoder may use a softmax function to determine the attention weights. Each timestep the attention decoder outputs a probability distribution over all possible characters used in a caption. The RNN language model receives a stream of the single activations and determines the caption (i.e., label). When multiple valid captions exist, the sound event(s), the RNN language model selects one of the valid captions based on the probability that it is a valid sentence in the target language (e.g., English).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
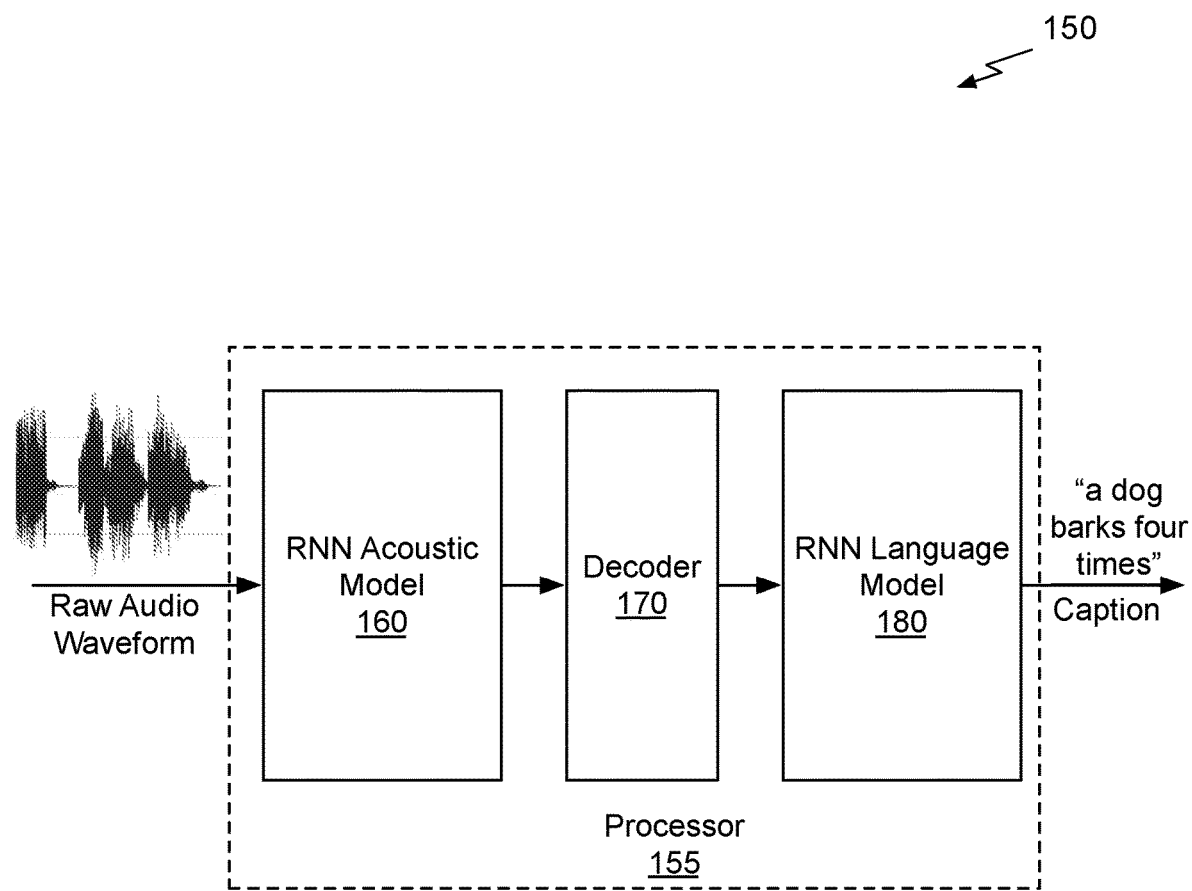
FIG. 1B illustrates a block diagram of an audio captioning system, in accordance with one embodiment.

FIG. 1B illustrates a block diagram of an audio captioning system 150, in accordance with one embodiment. The audio captioning system 150 includes an RNN acoustic model 160, a decoder 170, and a RNN language model 180. The audio captioning system 150 may be configured to perform the steps of the method 100. The processor 150 may be a graphics processor or any processor capable of performing the necessary arithmetic operations of the method 100. One or more of the RNN acoustic model 160, the decoder 170, and the RNN language model 180 can be implemented using any technically feasible techniques, including, without limitation, programming instructions executed by the processor 155 and/or circuitry configured to directly implement the operations.

In one embodiment, the RNN acoustic model 160 includes several layers of a neural network including layers configured to perform attention and time-adaptive computations. The output of the RNN acoustic model 160 is a probability distribution over characters along a sequence of timesteps. In one embodiment, a first stack of layers of the neural network includes one or more two-dimensional (2D) convolutional layers that receive an input audio frame per timestep. A first dimension of the 2D convolutional layers is a number of samples within each audio frame and a second dimension is the number of frames in an audio clip. A second stack of layers of the neural network in the RNN acoustic model 160 is a stack of recurrent layers that follows the first stack of layers. The recurrent layers process one audio frame each timestep and include connections from one audio frame to the next audio frame in a sequence. In other words, when processing a sequence including a first and second audio frame, the output of the recurrent layers resulting from processing the first audio frame during a first timestep is fed back into the recurrent layers as an input for processing the second audio frame during a second timestep. The output of the RNN acoustic model 160 is an activation vector for each timestep.

The decoder 170 receives the probability distribution over the characters generated by the RNN acoustic model 160. In a first embodiment, the decoder 170 is a connectionist temporal classification (CTC) decoder that receives the relevant features represented by the activation vector and constructs valid combinations of characters. The decoder 170 may be configured to remove repeated characters that are redundant. In a second embodiment, the decoder 170 performs a continuous associate lookup operation over each context vector generated by the RNN acoustic model 160 to reduce the context vector to a single activation for each timestep.

In one embodiment, the RNN language model 180 is a feed forward deep neural network with several layers, the final of which produces one output for each character in the target language and an end of sequence token. The end of sequence token indicates an end of each caption. In one embodiment, the RNN language model 180 is trained with a cross entropy loss function to predict the next character in the reference label (i.e., caption).

In one embodiment, the audio captioning system 150 is trained end-to-end using supervised learning. In one embodiment, the audio captioning system 150 is trained using one or more of stochastic gradient decent optimization, a hybrid connectionist temporal classification, and cross entropy loss function. A large training dataset of "training samples" includes pairs of audio clips as the raw audio input and corresponding human annotated descriptions as the captions. For example, a training sample in the training dataset is the pair ("dog.mp3", "a dog barks four times").

To produce a high quality audio captioning system 150, the training dataset should be as large as computationally feasible (e.g. thousands of hours or more). In one embodiment, the training dataset is accurately labeled by humans, i.e., neither the audio nor the labels in the training dataset are synthetically generated. In one embodiment, the training samples are drawn from the same distribution that the audio captioning system 150 is likely to encounter. Otherwise, if the audio captioning system 150 is not trained using samples of ocean waves, for example, the audio captioning system 150 will not be able to accurately describe recordings of waves crashing into rocks. In one embodiment, a diverse and unbiased training dataset is generated by crawling the internet to find the complete set of available audio recordings, randomly sampling from the complete set until a large enough set of clips is found, and then having humans manually label each clip.

When the audio captioning system 150 is trained using supervised learning, the RNN acoustic model 160, decoder 170, and RNN language model 180 are randomly initialized according to a standard method (e.g., Xavier initialization)

and audio clips from the training dataset are input to the audio captioning system 150 to generate a label (i.e., caption). The generated label is compared to the reference label (or set of labels) for the audio clip using one or more cost functions to generate a scalar loss. The cost function indicates the accuracy of the neural network that is being trained. An optimization algorithm then updates the model parameters (e.g., weights) of the RNN acoustic model 160 and/or the RNN language model 180 to reduce the loss. In one embodiment, the CTC decoder algorithm includes a beam search component, and includes a beam size parameter which determines the maximum number of labels to search for simultaneously. The number and size of each neural network layer should be chosen using a cross validation method. Additional training samples are applied until the RNN acoustic model 160 and/or the RNN language model 180 achieves a desired level of accuracy, or the model overfits on the dataset as determined via cross validation.

In one embodiment, a backpropagation algorithm is used to compute the gradient of the loss function with respect to parameters in the RNN acoustic model 160 and/or the RNN language model 180. In one embodiment, a recursive application of the chain rule is used to compute the gradient of the loss function with respect to parameters in the RNN acoustic model 160 and/or the RNN language model 180. A suitable optimization algorithm, such as stochastic gradient descent, Nesterov's accelerated gradient method, adaptive estimates of lower moments, etc. may used together with gradients produced by the backpropagation algorithm to find suitable values for parameters of the RNN acoustic model 160 and/or the RNN language model 180. In one embodiment, a search over nondifferentiable parameters such as a learning rate, number of layers, etc. using cross validation is performed on a portion of the training dataset that is not used to train the audio captioning system 150.

The quality of the resulting audio captioning system 150 depends significantly on the size and the quality of the dataset that it is trained on. A training dataset may be improved using data augmentation, where an individual audio signal may be mixed with noise, such as white noise. Noise samples may be drawn from white noise or specific training data sources and mixed with the original audio clip to improve the robustness of the trained audio captioning system 150. For example, mixing music or television clips into the background of people talking. Conventional data augmentation mixes noise with an audio clip and pairs the mixed audio clip with the label of the original audio clip. In other words, the label is the same for the original audio clip and for the mixed audio clip.

In contrast with traditional audio augmentation, when data augmentation is applied to a training dataset for the audio captioning system 150, the corresponding caption is a combination of the caption for the original audio clip and a caption for the additional audio clip. For example, when an original audio clip having the label "a man says 'good afternoon'" is combined with an additional audio clip having the label "rock music is playing" the labels can be automatically be combined into "a man says 'good afternoon' while rock music is playing in the background". Data augmentation ensures the system is robust in terms of invariance. Invariance means that two or more audio clips may be combined with different relative timing, so that the resulting waveforms are different, and the audio captioning system 150 will generate the same correct label. In particular, an audio clip used for training may include a combination of a first non-speech sound and a second sound that overlaps at least partially in time with the first non-speech sound, where the second sound is one of a non-speech sound, a speech sound, and noise samples.

RNN Acoustic Model

Figure 2A:
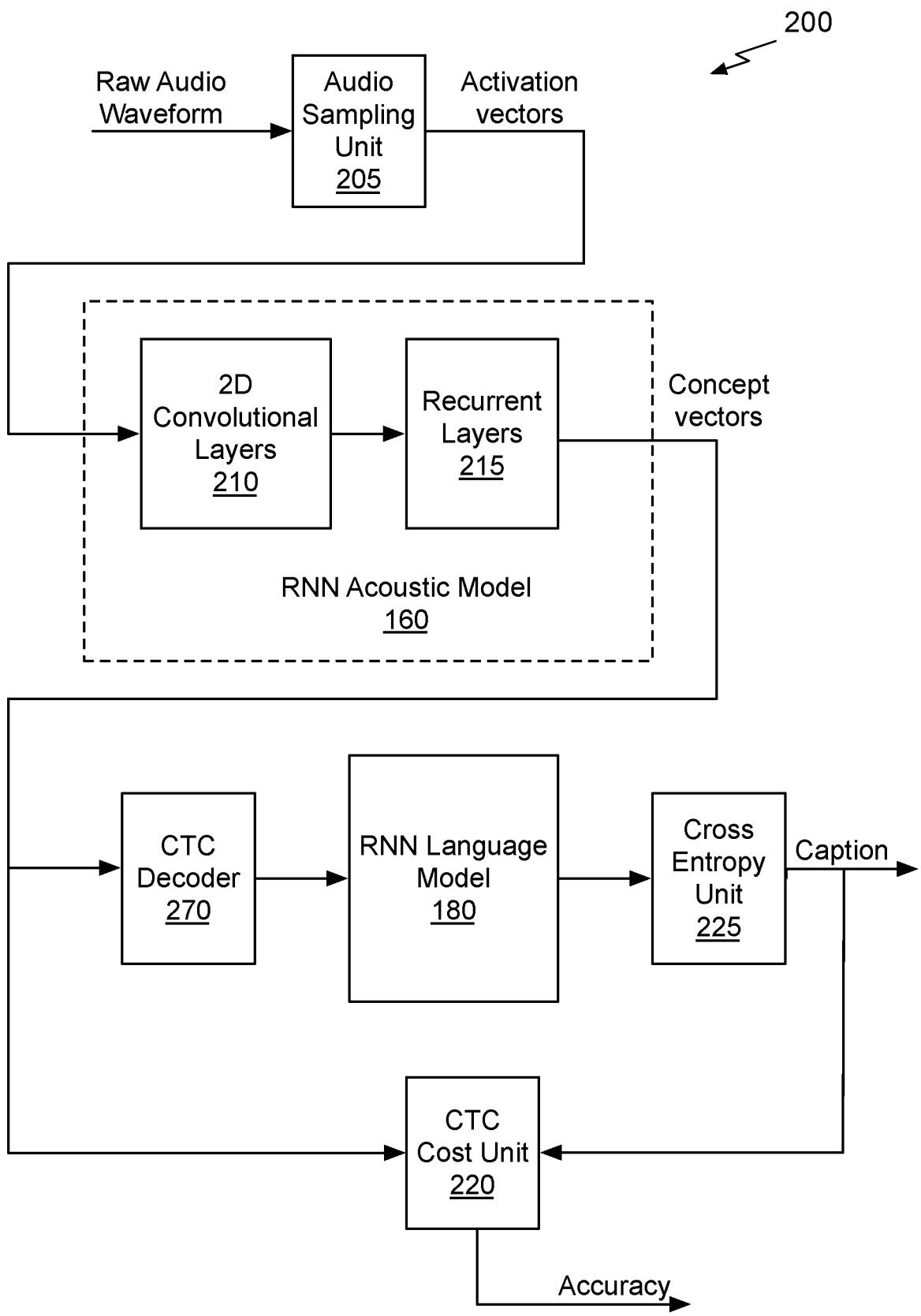
FIG. 2A illustrates another block diagram of an audio captioning system, in accordance with one embodiment.

FIG. 2A illustrates another block diagram of an audio captioning system 200, in accordance with one embodiment. The audio captioning system 200 may be used to implement the audio captioning system 150 shown in FIG. 1B. The audio captioning system 200 includes an audio sampling unit 205, the RNN acoustic model 160, a connectionist temporal classification (CTC) decoder 270, a CTC cost unit 220, the RNN language model 180, and a cross entropy unit 225.

The audio sampling unit 205 is configured to receive the raw audio waveform for an audio clip, sample the raw audio waveform, and generate frames of audio samples. Each audio sample corresponds to an activation vector that is input to the RNN acoustic model 160. The audio sampling unit 205 may be configured to implement one or more preprocessing operations on the audio samples before they are input to the RNN acoustic model 160.

As previously described in conjunction with FIG. 1B, the RNN acoustic model 160 includes a first stack of 2D convolutional layers 210 and a second stack of recurrent layers 215. When using the CTC decoder 270, the output of the RNN acoustic model 160 is a probability distribution over all of the possible characters used in a caption. The output of the RNN acoustic model 160 is a direct representation of the output caption. In one embodiment, the CTC decoder 270 removes redundant characters from the probability distribution representation.

When using the attention decoder 370, the output of the RNN acoustic model 160 is a sequence of concept vectors. Each element in the concept vector represents relevant features and corresponds to a character that may be included in the caption. The features represented in the concept vector are not determined a priori and are instead learned by the system during the end-to-end training process.

The number of layers, the size of filters in a given layer of the 2D convolutional layers 210, and the number of filters in a given layer are hyper-parameters that may be tuned using cross validation. In one embodiment, more layers, bigger filters, and more filters per layer improve performance given appropriate regularization or a large enough training dataset. In practice, the performance improvement should be balanced against computational limits, i.e. increasing the layer count, filter count, and/or filter size arbitrarily may result in an audio captioning system 150 or 200 that requires too much time to train. Consequently, in one embodiment, there is a maximum layer count, filter size, and filter count. In one embodiment, the maximum settings may be used to achieve the best accuracy, and when a tradeoff is required, cross validation is used to reduce the layer count, filter count, and/or filter size.

In one embodiment, the 2D convolutional layers 210 provide greater performance compared with fully connected or recurrent layers, and there is a natural interpretation of the 2D convolutions as implementations of frequency impulse response (FIR) filters with the parameters (e.g., weights) of the 2D convolutional layers 210 corresponding to FIR filter coefficients. The ability of the RNN acoustic model 160 to learn the parameters, allows the 2D convolutional layers 210 to perform an operation that is similar to a spectrogram, while having fine grained control over the frequency bands being measured. Therefore, the 2D convolutional layers 210 can be focused on specific frequency bands, e.g. 300 Hz-3 KHz for human speech, for specific musical instruments, etc.

For an embodiment of the audio captioning system 150 or 200 that does not have realtime performance constraints, the recurrent layers 215 may be bidirectional recurrent layers. The number of layers and layer size within the recurrent layers 215 may follow the same guidelines as is used for the 2D convolutional layers 210. For example, increasing the layer count and/or layer size may be subject to computational limitations. In one embodiment, a final layer of the recurrent layers 215 generates one element in the concept vector for each character in the target language specified for the captions. In one embodiment, hierarchical connectivity is implemented in the recurrent layers 215 in addition to direct connections from one timestep to the next. Hierarchical connectivity means that the computation for timestep t may include inputs from timestep t–N for any choice of N in addition to inputs from timestep t–1.

In one embodiment, one or more pooling layers are interleaved within the 2D convolution layers 210 and/or recurrent layers 215. In one embodiment, the one or more pooling layers are max pooling layers or other types of pooling such as mean pooling that combine the activations between layers over time.

During training of the audio captioning system 200, the concept vectors are processed by the CTC cost unit 220 to generate an accuracy value. In one embodiment, the CTC cost unit 200 implements CTC cost function, to compute a loss function according to the difference between the output of the audio captioning system 200 and all possible alignments of a list of possible labels. In one embodiment, the CTC cost function is fully differentiable and uses a continuous optimization algorithm, such as stochastic gradient descent, thereby enabling computation of gradients with respect to all parameters in the audio captioning system 200.

The concept vectors are also passed through the CTC decoder 270 that selects the most likely character for each timestep and collapses timesteps that output the same character, resulting in a shorter sequence of characters. In one embodiment, the CTC decoder 270 constructs valid combinations of characters to select the characters that are output. The sequence of characters then is passed through the RNN language model 180 that predicts the next character in the reference label. The cross entropy unit 225 may be configured to compute a CTC gradient, and the cross entropy loss function can be used to compute a gradient with respect to the second parameters of the RNN language model 180 as well as the parameters of the RNN acoustic model 160. In one embodiment, during training, a standard cross entropy cost function is used to compare the output of the RNN language model 180 against the reference label. If there are multiple valid labels, a combined loss function may be applied over all of the valid labels to measure the accuracy of the audio captioning system 200. A combined loss function may also be applied when the CTC cost function is used to consider all possible alignments of characters for all possible valid labels.

The cross entropy loss function may be optimized using standard techniques, such as batch/layer normalization, rectified linear activation functions, careful weight initialization (e.g. Glorot. et. al.), residual skip connections over individual layers, and advanced descent methods (e.g. Nesterov accelerated gradient, ADAM, RMSProp, etc).

Figure 2B:
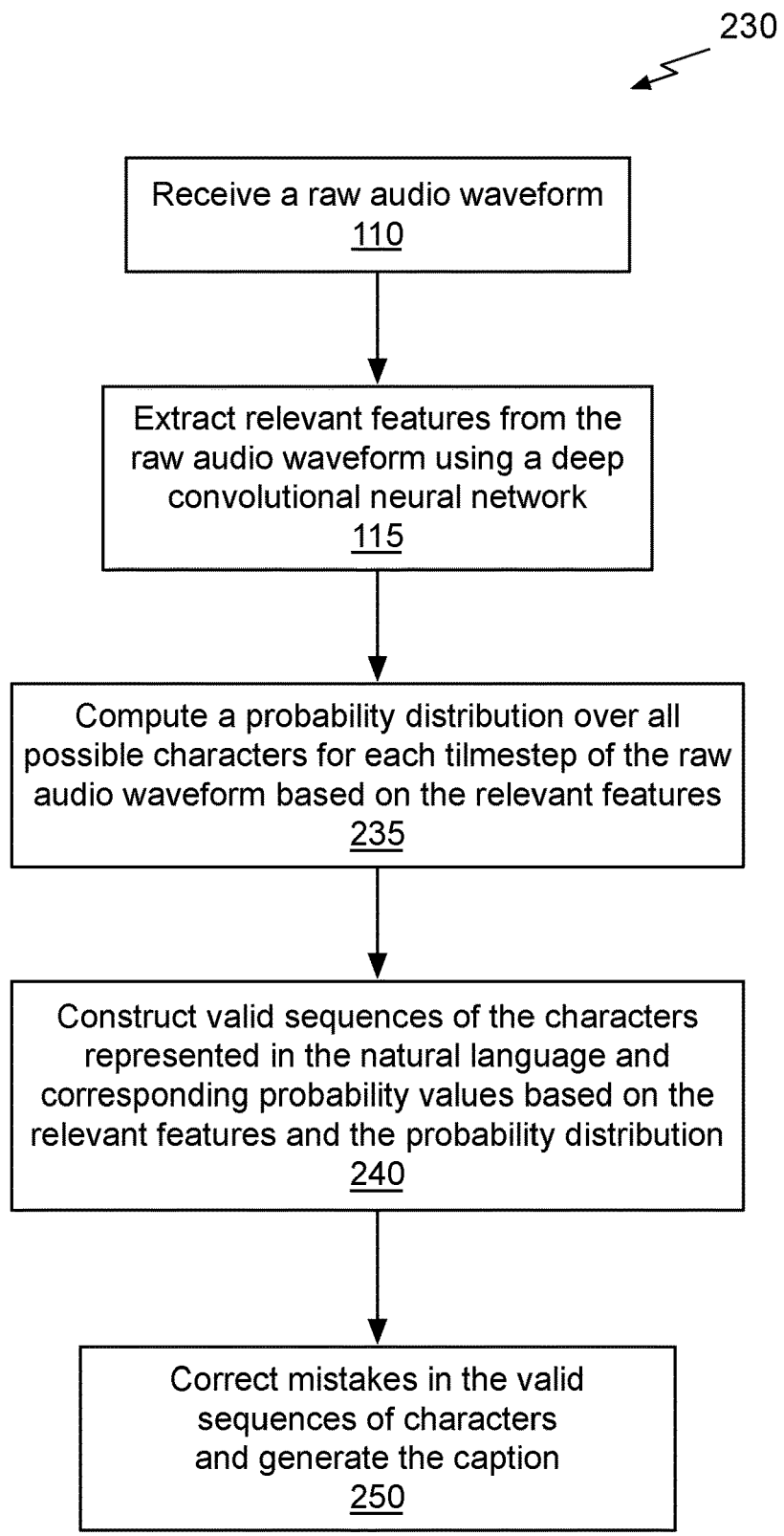
FIG. 2B illustrates another flowchart of a method for audio captioning, in accordance with one embodiment.

FIG. 2B illustrates another flowchart of a method 230 for audio captioning, in accordance with one embodiment. Although method 230 is described in the context of the RNN acoustic model 160, the decoder 270, and the RNN language model 180, the method 230 may also be performed by a program, custom circuitry, or by a combination of custom circuitry and a program. For example, the method 230 may be executed by a GPU, CPU, or any processor capable of performing the necessary operations. Furthermore, persons of ordinary skill in the art will understand that any system that performs method 230 is within the scope and spirit of embodiments of the present invention.

The steps 110 and 115 are performed as previously described in conjunction with FIG. 2B. The relevant features that are extracted from the raw audio waveform using the RNN acoustic model 160 are output as concept vectors. At step 235, a probability distribution over all possible characters represented in a natural language used for a caption is computed, for each timestep of the raw audio waveform, based on the concept vectors (i.e., relevant features). At step 240, the CTC decoder 270 receives the sets of characters and probability distributions and constructs valid sequences of the characters. The valid sequences of characters are each associated with a probability value and a number of the combinations having the highest probability values are output by the CTC decoder 270 to the RNN language model 180. In one embodiment, the CTC decoder 270 removes repeated characters that are redundant o produce the valid sequences of characters. At step 250, any mistakes in the valid sequence of characters are corrected using the RNN language model 180 and the caption is generated. For example, the phonetically plausible spelling mistake "Rock musac is playing." may be corrected to "Rock music is playing." by the language model. The caption may include one or more non-speech and/or speech events.

Audio Captioning with Attention

As previously described in conjunction with FIG. 2A, when the audio captioning system 150 does not implement attention, there is a one-to-one correspondence between input audio samples and timesteps of the RNN acoustic model 160. The generation of a concept vector for each sample in an audio frame can lead to excessive computation performed over audio frames that correspond to silence, can distract the network from the main signal, and prevent the RNN acoustic model 160 from performing more computation on difficult or interesting sections of the audio clip.

Attention addresses the problems related to per-sample generation of concept vectors by enabling the audio captioning system 150 to quickly scan the output from the RNN acoustic 160 for each timestep to identify timesteps that are relevant to the next output character. In one embodiment, attention is implemented in a standard form of content-based attention within the decoder 170 and an encoder component the RNN acoustic model 160.

Figure 3A:
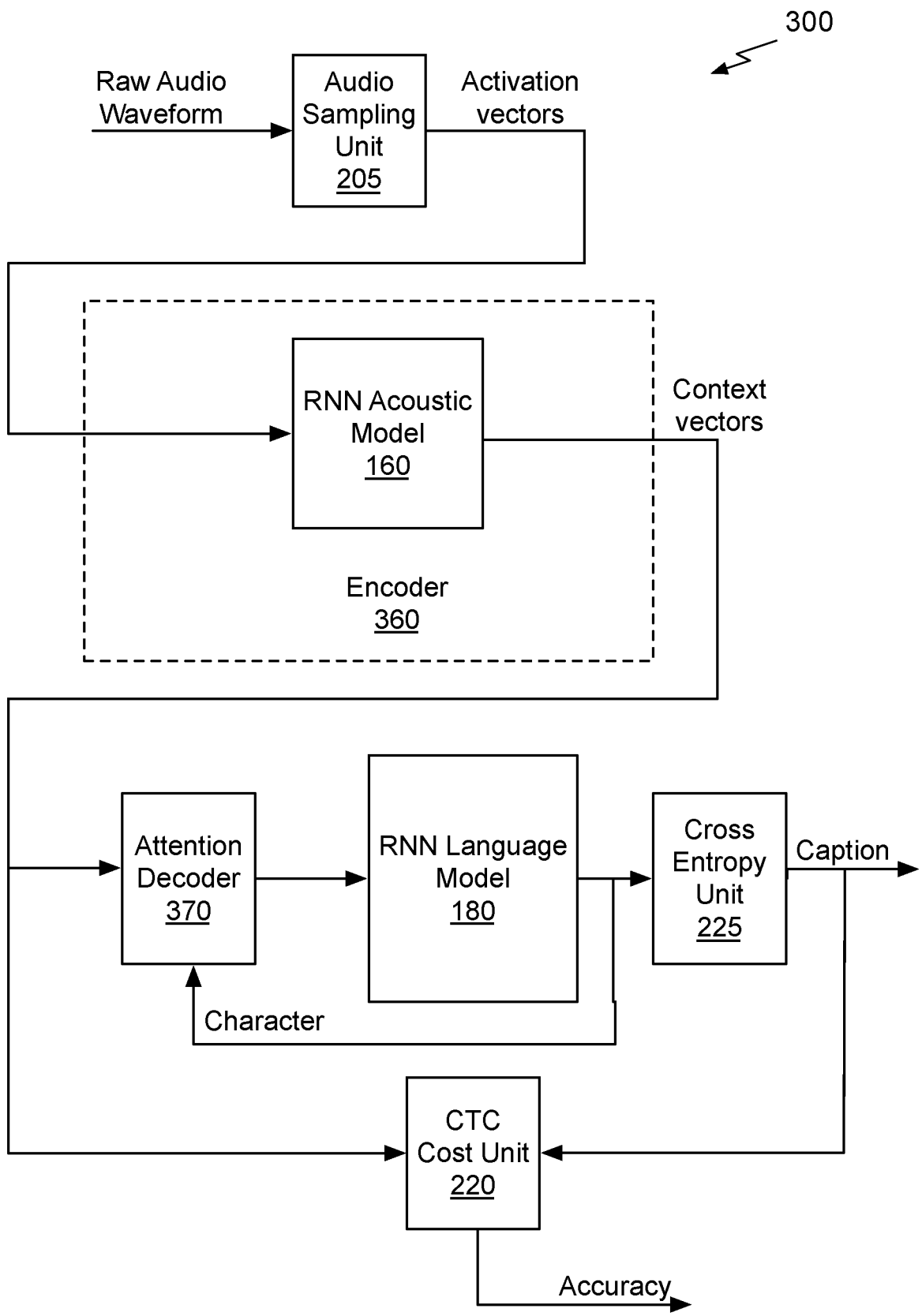
FIG. 3A illustrates another block diagram of an audio captioning system, in accordance with one embodiment.

FIG. 3A illustrates another block diagram of an audio captioning system 300, in accordance with one embodiment. The audio captioning system 300 may be used to implement the audio captioning system 150 shown in FIG. 1B. The audio captioning system 300 includes the audio sampling unit 205, the RNN acoustic model 160, an attention decoder 370, the CTC cost unit 220, the RNN language model 180, and a cross entropy unit 225.

The audio sampling unit 205 receives the raw audio waveform for an audio clip, samples the raw audio waveform, and generates frames of audio samples. Each audio sample corresponds to an activation vector that is input to the RNN acoustic model 160.

The RNN acoustic model 160 operates as an encoder 360. The RNN acoustic model 160 processes the activation vectors for the audio clip to identify one or more concepts present in the audio clip. Each concept corresponds to a separate caption. For each concept, the RNN acoustic model 160 produces a variable sized vector of activations referred to as a context vector. Multiple concept vectors may be used to describe a single caption. The context vector identifies whether the concept associated with the context vector is present for each timestep. In one embodiment, the context vector tags each timestep of the audio clip to indicate whether the concept is present during the timestep.

The attention decoder 370 performs a continuous associative lookup operation over each context vector to reduce the context vector into a single activation. In one embodiment, the attention decoder 270 performs the continuous associative lookup operation for all timesteps within a window including multiple timesteps. The single activation for the current timestep and the character that is generated by the RNN language model 180 for the previous timestep are processed by the attention decoder 370. The character for the previous timestep is used by the attention decoder 370 to determine when the end of a concept is reached. The attention decoder 370 processes the single activations resulting from the context vectors to generate an attention weight value for each timestep where a concept is present, until an end of sequence token is produced indicating the end of a caption has been reached. The attention weight values for a concept are then used by the attention decoder 370 to determine a sequence of characters associated with a caption describing the concept.

The attention decoder 370 produces an output sequence $(y_1, \ldots, y_T)$ of length T from an single activation input $h=(h_1, \ldots, h_L)$ of length L timesteps. The sequence y represents the characters in the output caption. Each output $y_i$ is generated by focusing and reading data from only the relevant elements of h. At the i-th step, the attention decoder 370 produces an output $y_i$ by focusing on the relevant elements of h:

$$\alpha_1 = \text{Attention}(s_{i1}, h)$$

$$g_i = \Sigma_{j=0}^{L} \alpha_{i,j} * h_j$$

$$y_i = \text{Decoder}(y_{i1}, g_i)$$

$s_{i1}$ is the (i1)-th hidden state of the attention decoder 370 network. In one embodiment, the attention decoder 370 is implemented by a deep RNN. In one embodiment, the deep RNN is implemented with a standard architecture such as Long-Short-Term-Memory (LSRM) or Gated-Recurrent-Unit (GRU). $\alpha_i$ is the list of attention weights generated by the attention decoder 370. Each value indicates a magnitude of the contribution from each input value (the single activations generated by the attention decoder 370).

The operation performed by the attention decoder 370 is implemented by scoring each element in h independently and then converting the resulting output values $e_{i,j}$ into a probability distribution $\alpha_{i,j}$, usually with a softmax operation.

$$e_{i,j} = \text{Score}(s_{i1}, h_j)$$

$$\alpha_{ij} = \frac{\exp(e_{i,j})}{\sum_{k=0}^{L} \exp(e_{i,k})}$$

The score operation may be implemented by a deep feed forward neural network or CNN.

The RNN language model 180 receives sequences of characters corresponding to each concept (i.e., sound event) from the attention decoder 370 and determines the caption (i.e., label) for each concept. When multiple valid captions exist, the RNN language model 180 selects one of the valid captions based on a probability that it is a valid sentence in the target language (e.g., English). In one embodiment, the RNN language model 180 is a feed forward deep neural network with several layers, the final of which produces one output for each character of the caption in the target language and an end of sequence token.

Figure 3B:
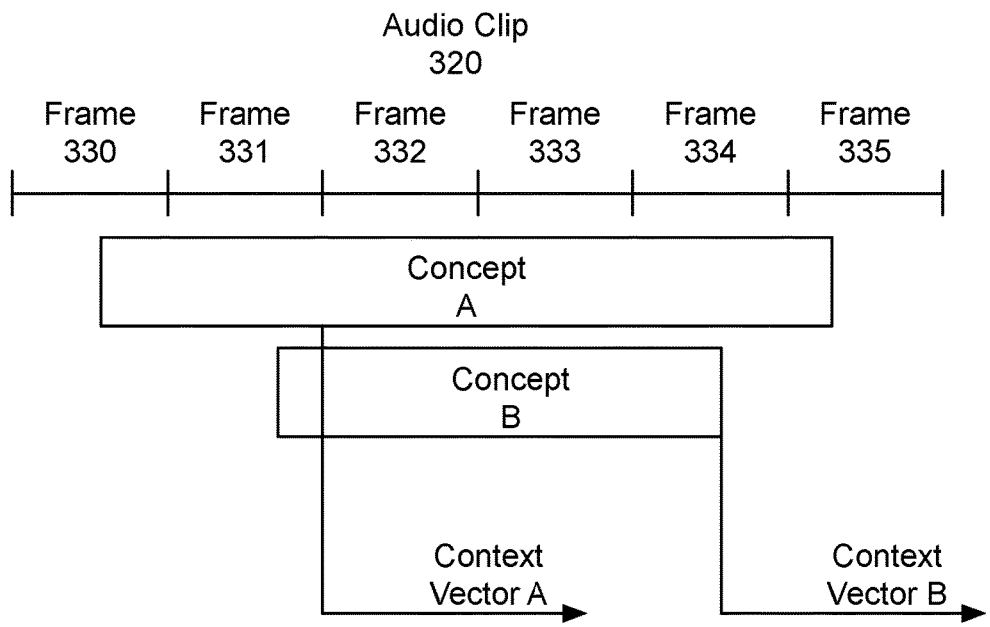
FIG. 3B is a conceptual diagram illustrating context vectors generated from audio clip frames, in accordance with one embodiment.

FIG. 3B is a conceptual diagram illustrating context vectors generated from audio clip frames, in accordance with one embodiment. An audio clip 320 is segmented into audio frames 330, 331, 332, 333, 334, and 335. Each audio frame is associated with a timestamp. A concept A is present for audio frames 330, 331, 332, 333, 334, and 335. A concept B is present for audio frames 331, 332, 333, and 334. The RNN acoustic model 160 generates a context vector A corresponding to concept A after audio frame 331 is processed and generates a context vector B corresponding to concept B at the end of concept B. The context vector A indicates that the concept A is present in audio frames 330, 331, 332, 333, 334, and 335. The context vector B indicates that the concept B is not present in audio frames 330 and 335 and is present in audio frames 331, 332, 333, and 334. The RNN acoustic model 160 may generate a context vector for a corresponding concept at any point within an audio frame in which the concept is present or when the end of the concept is reached.

Figure 3C:
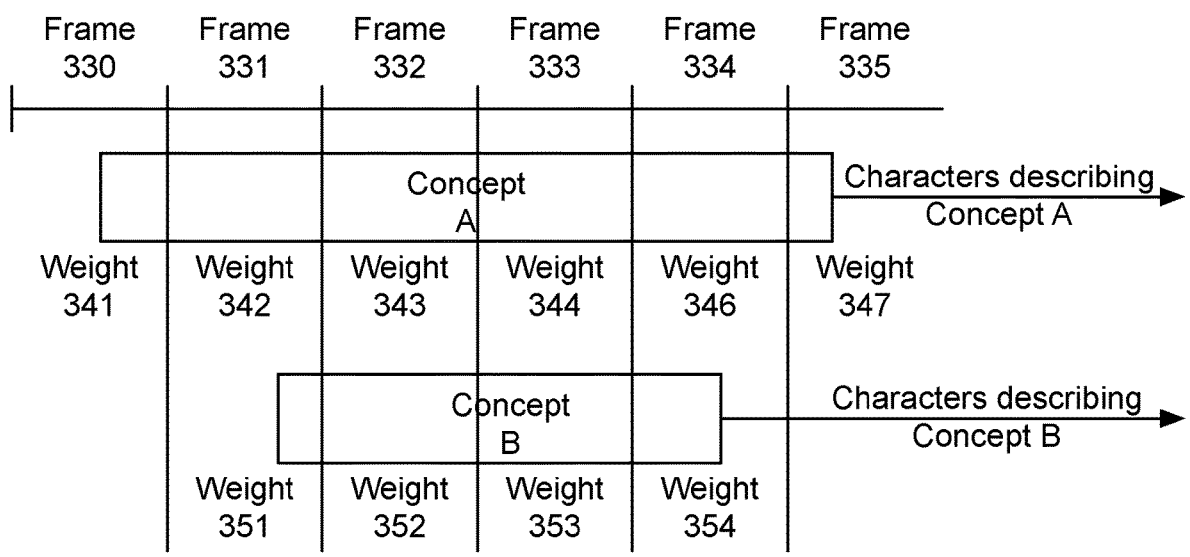
FIG. 3C is a conceptual diagram illustrating captions generated from concepts and attention weights, in accordance with one embodiment.

FIG. 3C is a conceptual diagram illustrating captions generated from concepts and attention weights, in accordance with one embodiment. The attention decoder 370 receives the context vector A and generates the attention weights 341, 342, 343, 344, 346, and 347. The attention decoder 370 receives the context vector B and generates the attention weights 351, 352, 353, and 354. Example attention weight values for audio frames 330, 331, 332, 333, 334, and 335 for concept A are 0.0, 0.7, 0.5, 0.2, 0.1, and 0.0, respectively, and for concept B are 0.0, 0.01, 0.75, 0.2, 0.0, 0.0, respectively. The attention decoder 370 produces the characters describing concept A and concept B, based on the respective weights.

Figure 3D:
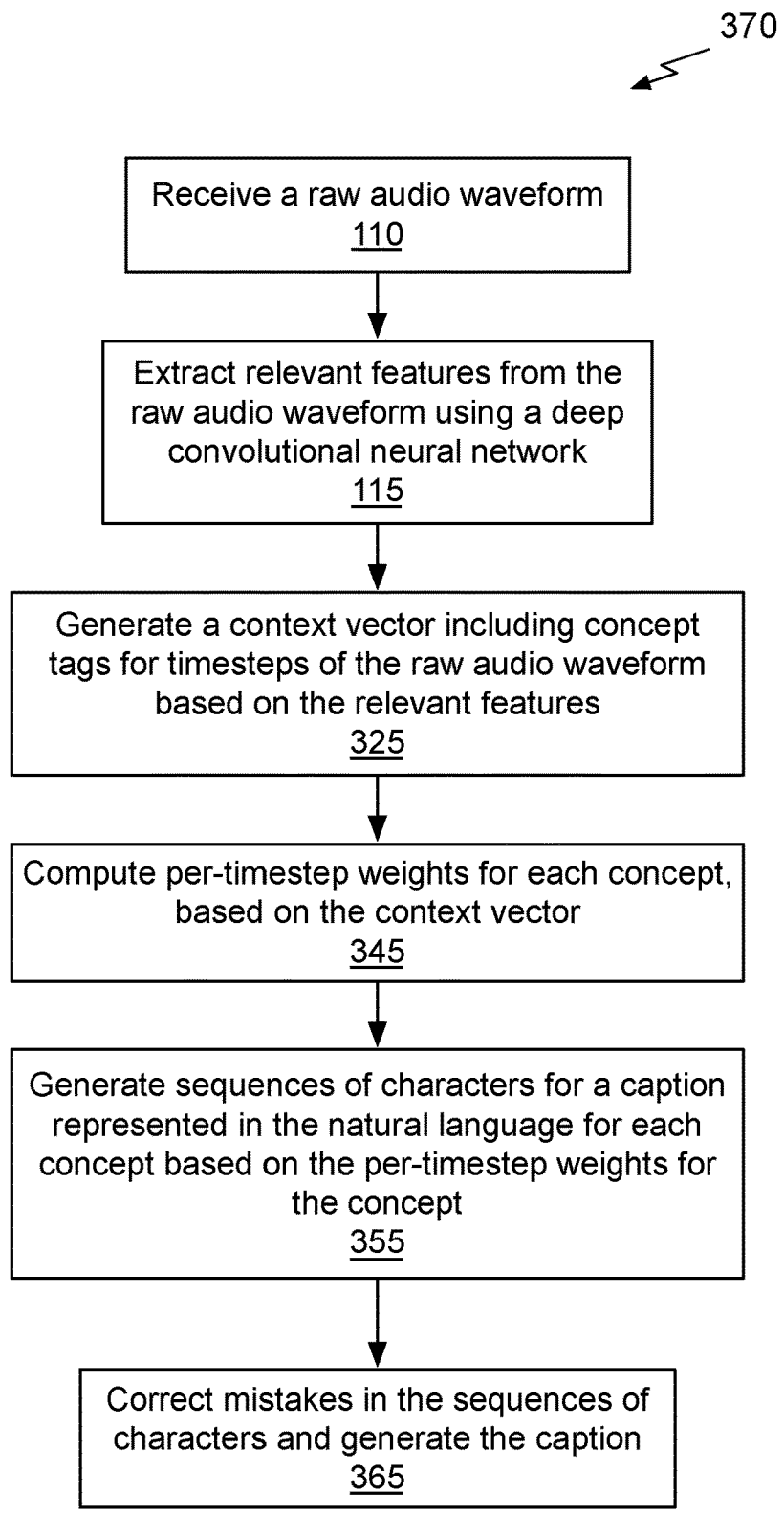
FIG. 3D illustrates another flowchart of a method for audio captioning, in accordance with one embodiment.

FIG. 3D illustrates a flowchart of a method 375 for audio captioning, in accordance with one embodiment. Although method 375 is described in the context of the RNN acoustic model 160, an attention decoder 370, and an RNN language model 180, the method 375 may also be performed by a program, custom circuitry, or by a combination of custom circuitry and a program. For example, the method 375 may be executed by a GPU, CPU, or any processor capable of performing the necessary operations. Furthermore, persons of ordinary skill in the art will understand that any system that performs method 375 is within the scope and spirit of embodiments of the present invention.

Steps 110 and 115 are performed as previously described in conjunction with FIGS. 1A and 2B. At step 325, the RNN acoustic model 160 generates a context vector that includes concept tags for timesteps of the raw audio waveform based on the relevant features. At step 345, based on the context vector, the attention decoder 370 computes per-timestep attention weights for each concept. At step 355, the attention decoder 370 generates sequences of characters for a caption represented in the natural language for each concept based on the per-timestep attention weights for the concept. At step 365, the RNN language model 180 corrects mistakes in the sequences of characters and generates the caption.

Exemplary System

Figure 4:
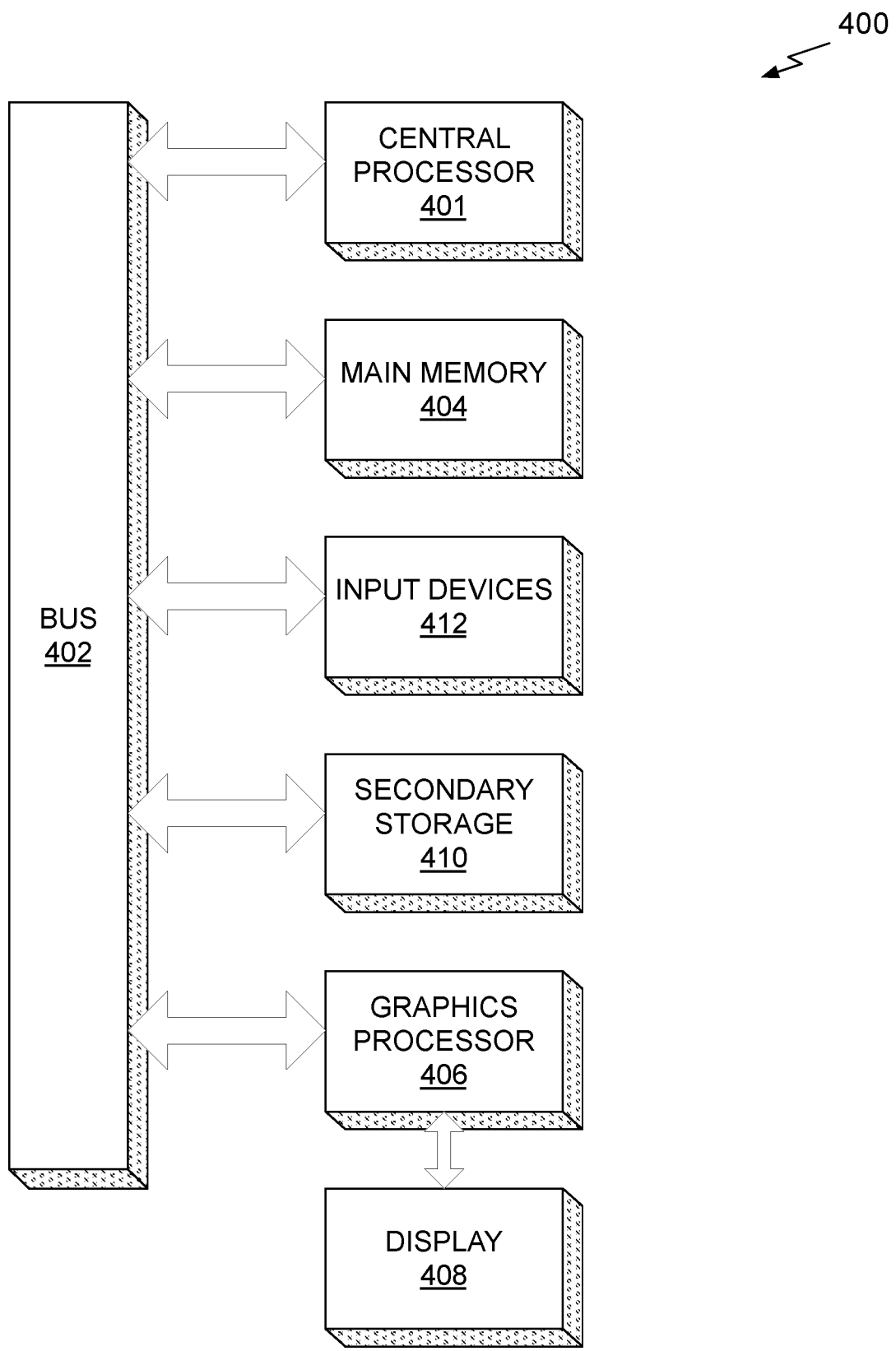
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. The exemplary system 400 may be used to implement the audio captioning system 150, 200, and 300 for automatically generating audio captions for both speech and non-speech events.

As shown, a system 400 is provided including at least one central processor 401 that is connected to a communication bus 402. The communication bus 402 may be implemented using any suitable protocol, such as PCI (Peripheral Component Interconnect), PCI-Express, AGP (Accelerated Graphics Port), HyperTransport, or any other bus or point-to-point communication protocol(s). The system 400 also includes a main memory 404. Control logic (software) and data are stored in the main memory 404 which may take the form of random access memory (RAM). In one embodiment, one or more training datasets are stored in the main memory 404.

The system 400 also includes input devices 412, a graphics processor 406, and a display 408, i.e. a conventional CRT (cathode ray tube), LCD (liquid crystal display), LED (light emitting diode), plasma display or the like. User input may be received from the input devices 412, e.g., keyboard, mouse, touchpad, microphone, and the like. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 404 and/or the secondary storage 410. Such computer programs, when executed, enable the system 400 to perform various functions. The memory 404, the storage 410, and/or any other storage are possible examples of computer-readable media. Data streams associated with gestures may be stored in the main memory 404 and/or the secondary storage 410.

In one embodiment, the architecture and/or functionality of the various previous figures may be implemented in the context of the central processor 401, the graphics processor 406, an integrated circuit (not shown) that is capable of at least a portion of the capabilities of both the central processor 401 and the graphics processor 406, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, server, workstation, game consoles, embedded system, and/or any other type of logic. Still yet, the system 400 may take the form of various other devices including, but not limited to a personal digital assistant (PDA) device, a mobile phone device, a television, etc.

Further, while not shown, the system 400 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for audio captioning, comprising:
   receiving a raw audio waveform including a non-speech sound;
   extracting, in one or more processors configured to implement a recurrent neural network (RNN) acoustic model, relevant features from the raw audio waveform using the RNN acoustic model;
   processing the relevant features by an attention decoder to generate an attention weight value for one or more timesteps during the non-speech sound; and
   successively generating a character for each attention weight value to produce a discrete sequence of characters represented in a natural language, wherein the discrete sequence of characters comprises a caption that describes the non-speech sound.

2. The computer-implemented method of claim 1, wherein the raw audio waveform further includes a speech sound and the caption also comprises text corresponding to the spoken language within the speech sound.

3. The computer-implemented method of claim 1, further comprising a RNN language model that receives the sequence of characters and at least one additional sequence of characters and selects the sequence of characters as the caption based on a probability value corresponding to validity of the sequence of characters in a target language.

4. The computer-implemented method of claim 1, further comprising training the RNN acoustic model using training audio waveforms, each training audio waveform comprising a combination of a first non-speech sound and a second sound that overlaps at least partially in time with the first non-speech sound.

5. The computer-implemented method of claim 4, wherein the combination corresponds to a first caption.

6. The computer-implemented method of claim 5, wherein a length of the overlap of the first non-speech sound and the second sound in each training audio waveform corresponding to the first caption varies among different training audio waveforms.

7. The computer-implemented method of claim 4, wherein the second sound is either a non-speech sound or a speech sound.

8. The computer-implemented method of claim 4, wherein the second sound is noise samples drawn from white noise, music, or television clips.

9. The computer-implemented method of claim 1, wherein the RNN acoustic model processes the relevant features and generates a context vector of activations for each timestep of the raw audio waveform including the non-speech sound.

10. The computer-implemented method of claim 9, wherein a number of activations in a first context vector is different than a number of activations in a second context vector.

11. The computer-implemented method of claim 9, wherein the attention decoder performs a continuous associative lookup operation over the context vector and at least one additional context vector to generate the attention weight values for each timestep where the non-speech sound is present.

12. The computer-implemented method of claim 1, wherein a first character generated by a RNN language model for a previous timestep of the one or more timesteps is used to determine an end of the discrete sequence of characters.

13. An audio captioning system, comprising:
one or more processors configured to implement a recurrent neural network (RNN) acoustic model that receives a raw audio waveform including a non-speech sound and extracts relevant features from the raw audio waveform; and
an attention decoder that is configured to:
process the relevant features to generate an attention weight value for one or more timesteps during the non-speech sound; and
successively generate a character for each attention weight value to produce a discrete sequence of characters represented in a natural language, wherein the discrete sequence of characters comprises a caption that describes the non-speech sound.

14. The audio captioning system of claim 13, wherein the RNN acoustic model includes a context unit that processes the relevant features and generates a context vector of activations for each timestep of the raw audio waveform including the non-speech sound.

15. The audio captioning system of claim 14, wherein the attention decoder performs a continuous associative lookup operation over the context vector and at least one additional context vector to generate the attention weight values for each timestep where the non-speech sound is present.

16. A non-transitory computer-readable media storing computer instructions for generating captions that, when executed by one or more processors, cause the one or more processors to perform the steps of:
receiving a raw audio waveform including a non-speech sound;
extracting, by the one or more processors configured to implement a recurrent neural network (RNN) acoustic model, relevant features from the raw audio waveform using the RNN acoustic model;
processing the relevant features by an attention decoder to generate an attention weight value for one or more timesteps during the non-speech sound; and
successively generating a character for each attention weight value to produce a discrete sequence of characters represented in a natural language, wherein the discrete sequence of characters comprises a caption that describes the non-speech sound.

17. The computer-implemented method of claim 12, wherein the RNN language model corrects a mistake in the discrete sequence of characters to produce the caption.

18. The computer-implemented method of claim 9, wherein the context vector is generated before a last timestep of the one or more timesteps during the non-speech sound.

19. The computer-implemented method of claim 9, wherein the context vector tags each timestep of the audio clip to indicate whether the non-speech sound is present during the timestep.

20. The audio captioning system of claim 13, further comprising a RNN language model coupled between the RNN acoustic model and the decoder, wherein a first character generated by the RNN language model for a previous timestep of the one or more timesteps is used to determine an end of the discrete sequence of characters.

* * * * *